(12) United States Patent
Xu et al.

(10) Patent No.: US 12,270,722 B2
(45) Date of Patent: Apr. 8, 2025

(54) REVERSIBLE POLAR DECOMPOSITION METHOD FOR BACKSCATTERING MUELLER MATRIX

(71) Applicant: WENZHOU MEDICAL UNIVERSITY, Wenzhou (CN)

(72) Inventors: Min Xu, Wenzhou (CN); Zhineng Xie, Wenzhou (CN); Weihao Lin, Wenzhou (CN)

(73) Assignee: WENZHOU MEDICAL UNIVERSITY, Zhejiang (CN)

( * ) Notice: Subject to any disclaimer, the term of this patent is extended or adjusted under 35 U.S.C. 154(b) by 0 days.

(21) Appl. No.: 18/555,999

(22) PCT Filed: Oct. 11, 2022

(86) PCT No.: PCT/CN2022/124561
§ 371 (c)(1),
(2) Date: Oct. 18, 2023

(87) PCT Pub. No.: WO2023/236406
PCT Pub. Date: Dec. 14, 2023

(65) Prior Publication Data
US 2024/0264036 A1    Aug. 8, 2024

(30) Foreign Application Priority Data
Jun. 9, 2022 (CN) .......................... 202210650209.7

(51) Int. Cl.
G01M 11/02 (2006.01)
(52) U.S. Cl.
CPC .............. G01M 11/0207 (2013.01)
(58) Field of Classification Search
CPC .............. G01M 11/0207; G01J 4/04
See application file for complete search history.

(56) References Cited

U.S. PATENT DOCUMENTS 4,516,855 A * 5/1985 Korth ................ G01J 4/00
356/369
7,289,211 B1 * 10/2007 Walsh, Jr. ............ G01J 4/04
356/369

(Continued)

FOREIGN PATENT DOCUMENTS

| CN | 110261317 A | 9/2019 |
| CN | 110742584 A | 2/2020 |
| CN | 113984676 A | 1/2022 |

OTHER PUBLICATIONS

Ossikovski, Razvigor, et al., "Forward and reverse product decompositions of depolarizing Mueller matrices," *Optics Letters*, vol. 32, No. 6, pp. 689-691 (Mar. 15, 2007).

(Continued)

*Primary Examiner* — Roy M Punnoose
(74) *Attorney, Agent, or Firm* — Christensen, Fonder, Dardi & Herbert PLLC (57) ABSTRACT

A reciprocal polar decomposition for a backscattering Mueller matrices, including the following steps: step 1, according to the reciprocity of forward light path and backward light path, transforming the Mueller matrix M of backscattering into a symmetric matrix QM; step 2, obtaining a diattenuator matrix $M_{D1}$ by a matrix QMG; step 3, obtaining eigenvalues and eigenvectors through orthogonal decomposition; step 4, sorting the eigenvectors to obtain a depolarization matrix $M_{\Delta d}$ and a retarder matrix $M_{R1}$; and step 5, obtaining polarization parameters by the obtained depolarization matrix $M_{\Delta d}$ and retarder matrix $M_{R1}$. By using this decomposition, a systematic solution for decomposing the backscattering Mueller matrix is given firstly, and polarization parameters (such as an orientation angle, linear retarder, and depolarization) for characterizing a microstructure of a medium are obtained.

8 Claims, 4 Drawing Sheets
(2 of 4 Drawing Sheet(s) Filed in Color)

(56) References Cited

U.S. PATENT DOCUMENTS

| | | | | |
|---|---|---|---|---|
| 11,169,311 | B2* | 11/2021 | Rubin | G02B 27/286 |
| 2003/0067602 | A1* | 4/2003 | Patel | G01J 3/447 |
| | | | | 356/369 |
| 2004/0012853 | A1* | 1/2004 | Garcia | G02B 21/0068 |
| | | | | 359/489.08 |
| 2005/0264813 | A1* | 12/2005 | Giakos | G01J 3/447 |
| | | | | 356/369 |
| 2006/0164643 | A1* | 7/2006 | Giakos | G01J 3/433 |
| | | | | 356/369 |
| 2021/0048569 | A1* | 2/2021 | Rubin | G01M 11/00 |
| 2023/0124259 | A1* | 4/2023 | Mehta | G01N 21/6458 |
| | | | | 356/364 |

OTHER PUBLICATIONS

Ossikovski, Razvigor, "Analysis of depolarizing Mueller matrices through a symmetric decomposition," *J. Opt. Soc. Am. A*, vol. 26, No. 5, pp. 1109-1118 (May 2009).

* cited by examiner

REVERSIBLE POLAR DECOMPOSITION METHOD FOR BACKSCATTERING MUELLER MATRIX

RELATED APPLICATIONS

The present application is a National Phase entry of PCT Application No. PCT/CN2022/124561, filed Oct. 11, 2022, which claims priority to Chinese Patent Application No. 202210650209.7, filed Jun. 9, 2022, the disclosures of which are hereby incorporated by reference herein in their entirety.

TECHNICAL FIELD

The present disclosure particularly relates to a reciprocal polar decomposition for backscattering Mueller matrices.

BACKGROUND OF THE INVENTION

Polarization imaging is a label-free non-destructive detection technology based on an interaction between polarized light and a medium, and microstructural information can be obtained from the medium or a biological tissue by polarization measurement. Due to the concurrence of scattering and polarization effects, 16 matrix elements of a Mueller matrix have different responses to the change of a polarization state, and there is a complex relationship among the matrix elements. It is necessary to decompose and transform the Mueller matrix to obtain parameters for characterizing various polarization characteristics of the medium. Decomposed sub-matrices and various coefficients can independently reflect a certain polarization property of the medium, and then characterize optical properties and a microstructure of the medium, which also provides the feasibility for imaging and detection. In biomedicine, Mueller matrix decomposition is used to determine a state of the tissue, monitor an optical process of the tissue, distinguish a cancerous tissue from normal tissues, analyze sources of tissue lesions, etc. In chemistry and materials science, it can be used to dynamically monitor structural changes and material growth in materials.

Currently, the most common decomposition is Lu-chipman polar decomposition which is published by Lu S Y and Chipman R A under the title of Interpretation of Mueller matrices based on polar decomposition in J.opt.soc.am.a in 1996, and this decomposition is widely used to analyze an interaction between polarized light and the medium. However, this decomposition is only applicable to forward scattering and is not suitable for backscattering. Compared with the forward scattering, the backscattering is more common, simpler in experimental conditions, and higher in practical value, while the backscattering Mueller matrix is more complex. How to decompose the backscattering Mueller matrix is critical for backscattering polarization imaging.

SUMMARY OF THE INVENTION

For overcoming defects in the prior art, the objective of the present disclosure is to provide reciprocal polar decomposition for backscattering Mueller matrices.

In order to achieve the above-mentioned objective, the present disclosure provides reciprocal polar decomposition for backscattering Mueller matrices, including the following steps:

step 1, according to the relation between a diattenuator matrix and a retarder matrix of each of forward and backward paths, transforming the Mueller matrix M of backscattering into symmetric matrix QM, step 2, obtaining a diattenuator matrix $M_{D1}$ by the matrix QMG;

step 3, obtaining eigenvalues and eigenvectors through orthogonal decomposition;

step 4, sorting the eigenvectors to obtain a depolarization matrix $M_{\Delta d}$ and a retarder matrix $M_{R1}$; and step 5, obtaining polarization parameters by the obtained depolarization matrix $M_{\Delta d}$ and retarder matrix $M_{R1}$.

In step 1, the reciprocal polar decomposition decomposes the backscattering Mueller matrix into $M = M_{D2} M_{R2} M_{\Delta d} M_{R1} M_{D1}$, wherein $M_{R1}$ is the retarder matrices in the forward path, $M_{D1}$ is the diattenuator matrices in the forward path, $M_{\Delta d}$ is the depolarization matrix, $M_{R2}$ is the retarder matrices in the backward path, and $M_{D2}$ is the diattenuator matrices in the backward path;

according to the reciprocity of forward light path and backward light path, the diattenuator matrix and the retarder matrix of the backward path are represented by the diattenuator matrix and the phase retarder matrix of the forward path:

$$M_{D2} = Q M_{D1}^T Q$$

$$M_{R2} = Q M_{R1}^T Q$$

wherein $Q = \text{diag}(1, 1, -1, 1)$;

the backscattering Mueller matrix is converted into the symmetric matrix according to $$QM = M_{D1}^T M_{R1}^T M'_{\Delta d} M_{R1} M_{D1}, \text{ wherein } M_{D1} = \begin{pmatrix} 1 & D^T \\ D & m_D \end{pmatrix},$$

$$M_{R1} = \begin{pmatrix} 1 & 0^T \\ 0 & m_R \end{pmatrix}, M'_{\Delta d} = Q M_{\Delta d} = \text{diag}(d_0, d_1, -d_2, d_3),$$

$$m_D = \sqrt{1-D^2}\, I + \left(1 - \sqrt{1-D^2}\right) \hat{D} \hat{D}^T,$$

a diattenuator vector D has a length D, I is a 3×3 unit matrix, $$\hat{D} = D/|D|, (m_R)_{ij} = \delta_{ij} \cos R + a_i a_j (1 - \cos R) + \sum_{k=1}^{3} \varepsilon_{ijk} a_k \sin R,$$

$\delta_{ij}$ is a Kronecker function, $\varepsilon_{ijk}$ is a Levi-Civita permutation symbol, R is a retarder, and $$(1, a_1, a_2, a_3)^T = \left(1, \hat{R}^T\right)^T$$

is a normalized Stokes vector of a fast axis.

The symmetry of the matrix QM is ensured according to $$QM = \frac{(QM + QM^T)}{2}.$$

In step 2, $$(QMG)\begin{pmatrix} 1 \\ D \end{pmatrix} = d_0(1-D^2)\begin{pmatrix} 1 \\ D \end{pmatrix}$$

is obtained according to $$(QMG)(M_{D1}G) = (1-D^2)M_{D1}^T(M_{R1}^T M'_{\Delta d} M_{R1}) = (1-D^2)M_{D1}^T M',$$

$$M' = M_{R1}^T M'_{\Delta d} M_{R1} = \begin{pmatrix} d_0 & 0^T \\ 0 & m' \end{pmatrix}, \text{ and } QM = \frac{(QM + QM^T)}{2},$$

the diattenuator vector D is obtained therefrom, and then, the retarder matrix $M_{D1}$ and M' are obtained, wherein G=diag(1, −1, −1, −1).

In step 3, $$m_R^T \text{diag}(d_1, -d_2, d_3) m_R = m'$$

is obtained according to $$(1-D^2)M_{D1}^{-1} = GM_{D1}G \text{ and } M' = M_{R1}^T M'_{\Delta d} M_{R1} = M_{D1}^{-1} QM M_{D1}^{-1},$$

and orthogonal decomposition is performed to obtain the eigenvalues and eigenvectors.

The obtained eigenvalues are sorted to obtain $M_{\Delta d}$ and $M_{R1}$.

In the absence of known information of the medium, and on the premise that det($m_R$)=1, an order is determined by adopting a strategy that an absolute value of a total retarder R is minimized, and taking smaller absolute values of optical rotation ψ and a linear retarder δ into accountretarderretarder, so that $M_{\Delta d}$ and $M_{R1}$ are obtained.

The present disclosure has the beneficial effects: this decomposition not only provides a systematic method for decomposing the backscattering Mueller matrix, but also obtain polarization parameters (such as an orientation angle, retardance, and depolarization) for characterizing a microstructure of a medium.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

DETAILED DESCRIPTION OF THE INVENTION

The technical solutions in the embodiments of the present disclosure will be described clearly and completely below in conjunction with the accompanying drawings in the embodiments of the present disclosure. Obviously, the described embodiments are only a part of the embodiments of the present disclosure, not all the embodiments. Based on the embodiments of the present disclosure, all other embodiments obtained by those of ordinary skill in the art without creative work shall fall within the protection scope of the present disclosure.

It should be noted that all directional indications (such as upper, lower, left, right, front, rear . . . ) in the embodiments of the present disclosure are only intended to explain a relative position relation, movement conditions and the like among all components in a specific posture (as shown in the accompanying drawings), and if the specific posture is changed, the directional indications are also changed accordingly.

In the present disclosure, the terms "connection", "fixation" and the like should be understood in a broad sense unless otherwise specified and defined, for example, "fixation" may be fixed connection or detachable connection or an integral whole, may be mechanical connection or electrical connection, may be direct connection or indirect connection through an intermediate medium, and may be internal connection of two elements or interaction between two elements, unless it may be clearly defined otherwise. For those of ordinary skill in the art, the specific meanings of the above terms in the present disclosure may be understood according to specific situations.

Figure 1:
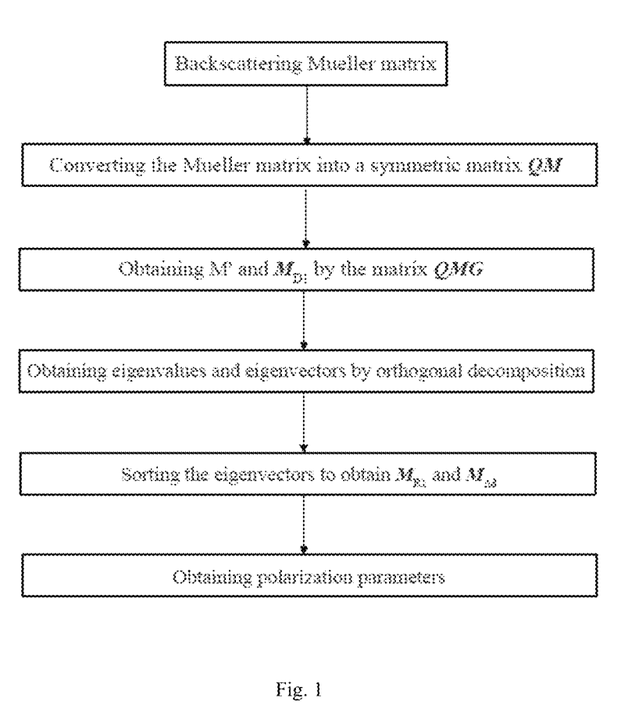
FIG. 1 is a diagram of specific steps in the present disclosure.

As shown in FIG. 1, the present disclosure provides reciprocal polar decomposition for backscattering Mueller matrices, including the following steps:

step 1, according to the relation between a diattenuator matrix and a retarder matrix of each of forward and backward paths, transforming the Mueller matrix M of backscattering into symmetric matrix QM;

step 2, a diattenuator matrix $M_{D1}$ is obtained by a matrix QMG (the matrix QMG is a product of the matrix QM and a matrix G);

step 3, obtaining eigenvalues and eigenvectors through orthogonal decomposition; step 4, sorting the eigenvalues to obtain a depolarization matrix $M_{\Delta d}$ and a retarder matrix $M_{R1}$; and step 5, obtaining polarization parameters by the obtained depolarization matrix $M_{\Delta d}$ and retarder matrix $M_{R1}$.

In backscattering, the backscattering Mueller matrix M may be expressed as:

$$M = M_{D2} M_{R2} M_{\Delta d} M_{R1} M_{D1} \qquad (1)$$

wherein $M_{R1}$ is the retarder matrices in the forward path, $M_{D1}$ is the diattenuator matrices in the forward path, $M_{\Delta d}$ is the depolarization matrix, $M_{R2}$ is the retarder matrices in the backward path, and $M_{D2}$ is the diattenuator matrices in the backward path;

the light path is reciprocal in backscattering. The diattenuator matrix and the retarder matrix of the backward path are represented by the diattenuator matrix and the retarder matrix of the forward path:

$$M_{D2} = QM_{D1}^T Q \quad (2)$$

$$M_{R2} = QM_{R1}^T Q$$

wherein Q=diag(1, 1, −1, 1);

the backscattering Mueller matrix is converted into the symmetric matrix according to a formula (3), and the symmetry of the matrix QM is ensured according to a formula (4):

$$QM = M_{D1}^T M_{R1}^T M'_{\Delta d} M_{R1} M_{D1} \quad (3)$$

$$QM = \frac{(QM + QM^T)}{2} \quad (4)$$

$$M_{D1} = \begin{pmatrix} 1 & D^T \\ D & m_D \end{pmatrix} \quad (5)$$

$$M_{R1} = \begin{pmatrix} 1 & 0^T \\ 0 & m_R \end{pmatrix} \quad (6)$$

$$M'_{\Delta d} = QM_{\Delta d} = \text{diag}(d_0, d_1, -d_2, d_3) \quad (7)$$

wherein $$m_D = \sqrt{1-D^2}\, I + \left(1 - \sqrt{1-D^2}\right)\hat{D}\hat{D}^T,$$

I is a 3×3 unit matrix, $$\hat{D} = D/|D|,\ (m_R)_{ij} = \delta_{ij}\cos R + a_i a_j (1 - \cos R) + \sum_{k=1}^{3} \varepsilon_{ijk} a_k \sin R,$$

$\delta_{ij}$ is a Kronecker delta, $\varepsilon_{ijk}$ is a Levi-Civita permutation symbol, R is a retarder, and $$(1, a_1, a_2, a_3)^T = \left(1, \hat{R}^T\right)^T \quad 45$$

is a normalized Stokes vector of a fast axis.

A formula (10) is obtained according to a formula (8), a formula (9) and a formula (4), there is only one positive eigenvalues ($d_0(1-D^2)$) in the formula (10), a diattenuator vector D may be obtained according to relevant eigenvectors, and thus, the diattenuator matrix $M_{D1}$ is obtained:

$$(QMG)(M_{D1}G) = (1-D^2)M_{D1}^T\left(M_{R1}^T M'_{\Delta d} M_{R1}\right) = (1-D^2)M_{D1}^T M' \quad (8)$$

$$M' = M_{R1}^T M'_{\Delta d} M_{R1} = \begin{pmatrix} d_0 & 0^T \\ 0 & m' \end{pmatrix} \quad (9)$$

$$(QMG)\begin{pmatrix} 1 \\ D \end{pmatrix} = d_0(1-D^2)\begin{pmatrix} 1 \\ D \end{pmatrix} \quad (10)$$

wherein G=diag(1, −1, −1, −1).

M' is obtained according to a formula (11) and a formula (12), and then, the eigenvalues and eigenvectors are obtained by orthogonal decomposition according to a formula (13):

$$(1-D^2)M_{D1}^{-1} = GM_{D1}G \quad (11)$$

$$M' = M_{R1}' M'_{\Delta d} M_{R1} = M_{D1}^{-1} QMM_{D1}^{-1} \quad (12)$$

$$m_R^T \text{diag}(d_1, -d_2, d_3) m_R = m' \quad (13)$$

The order of the above-mentioned feature values and the feature vectors which are obtained by decomposition and sign symbols of the feature vectors are undetermined, and therefore, the order and symbols of the feature values and the relevant feature vectors need to be determined. If there is known information about depolarization properties of a medium, the order and symbols of the feature vectors may be determined. In the absence of known information of the medium, and on the premise that det($m_R$)=1, the order is determined by adopting a strategy that an absolute value of a total retarder R is minimized, and taking generally smaller optical rotation (i.e., a circular retarder) of a tissue sample and smaller absolute values of optical rotation W and a linear retarder S into account, so that $M_{\Delta d}$ and $M_{R1}$ are obtained.

A linear retarder and an optical rotation effect may occur at the same time or in order; when they occur in order, an orientation angle θ, optical rotation ψ, a linear retarder δ and a depolarization Δ are obtained according to formulae (14) to (19); and when they occur at the same time, a total retarder R, an orientation angle θ, optical rotation ψ and a linear retarder δ are obtained according to formulae (20) to (26).

$$\psi = \frac{1}{2}\text{atan2}\left(\frac{M_{R1}(2,3) - M_{R1}(3,2)}{M_{R1}(2,2) + M_{R1}(3,3)}\right) \quad (14)$$

$$M_{CR1} = \begin{pmatrix} 1 & 0 & 0 & 0 \\ 0 & \cos 2\psi & \sin 2\psi & 0 \\ 0 & -\sin 2\psi & \cos 2\psi & 0 \\ 0 & 0 & 0 & 1 \end{pmatrix} \quad (15)$$

$$M_{LR1} = M_{CR1}^T M_{R1} \quad (16)$$

$$\theta = \frac{1}{2}\text{atan2}(M_{LR1}(4,2) - M_{LR1}(2,4), M_{LR1}(3,4) - M_{LR1}(4,3)) \quad (17)$$

$$\delta = \cos^{-1}\left(\{[M_{R1}(2,3) - M_{R1}(3,2)]^2 + [M_{R1}(2,2) + M_{R1}(3,3)]^2\}^{\frac{1}{2}} - 1\right) \quad (18)$$

$$\Delta = 1 - \frac{1}{3}\left[tr\left(\left|\frac{M_{\Delta d}}{(M_{\Delta d})_{00}}\right|\right) - 1\right] \quad (19)$$

$$R = \cos^{-1}\left(\frac{tr(M_{R1})}{2} - 1\right) \quad (20)$$

$$r_1 = \frac{M_{R1}(3,4) - M_{R1}(4,3)}{2\sin R} \quad (21)$$

$$r_2 = \frac{M_{R1}(4,2) - M_{R1}(2,4)}{2\sin R} \quad (22)$$

$$r_3 = \frac{M_{R1}(2,3) - M_{R1}(3,2)}{2\sin R} \quad (23)$$

$$\delta = R\left(\sqrt{r_1^2 + r_2^2}\right) \quad (24)$$

-continued $$\psi = R\frac{r_3}{2} \quad (25)$$

$$\theta = \frac{1}{2}\text{atan2}(r_2, r_1) \quad (26)$$

wherein $M_{CR1}$ and $M_{LR1}$ are respectively a circular retarder matrix and a linear retarder matrix of $M_{R1}$.

Figure 2:
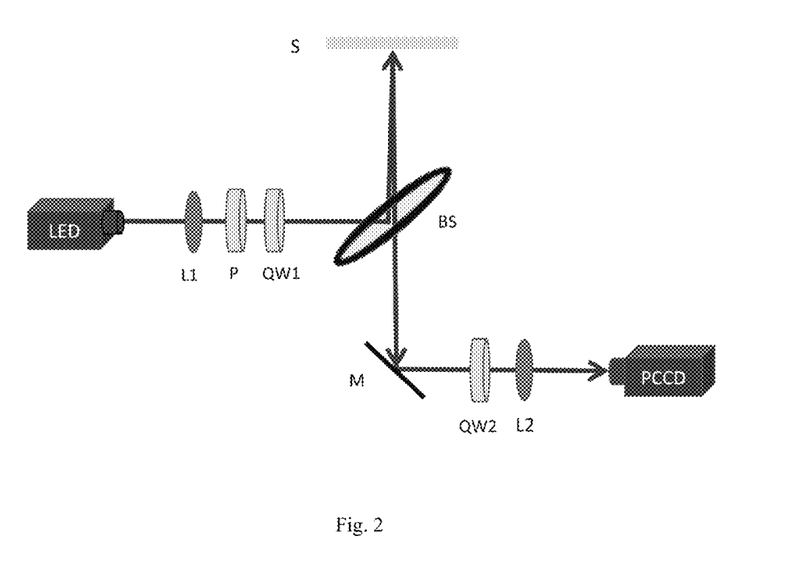
FIG. 2 is a schematic diagram of a beam path for backscattering polarization apparatus.

The polarization imaging system is shown in FIG. 2. LED (633 nm) light passes through a first lens L1, polarizer (P, Thorlabs) and a quarter wave plate (QW1, Thorlabs) and is reflected to a sample S by a thin-film beam splitter (BS, Thorlabs). Photons scattered from the sample are reflected by a reflecting mirror (M), pass through a quarter wave plate (QW2, Thorlabs) and second lens L2, and are received by a polarization camera (PCCD, FLIR BFS-U3-51S5P-C). A Mueller matrix of each optical element is measured, and the interference of stray light is eliminated, so that a precise Mueller matrix is obtained.

Figure 3:
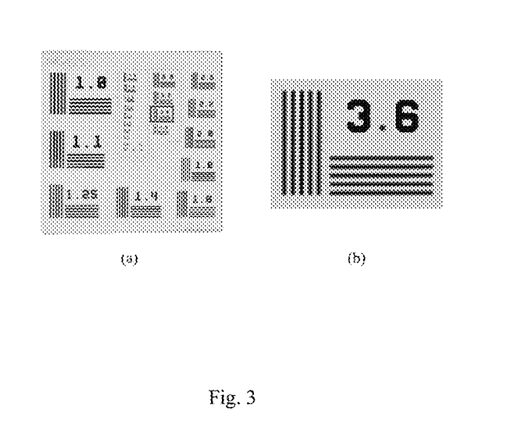
FIG. 3 is a diagram of a birefringent target of an experimental sample.

In order to study the feasibility of reciprocal polar decomposition of the Mueller matrix in a backscattering geometry, an NBS 1963A birefringent resolution target (Thorlabs, R2L2S1B) is selected as the sample. As shown in FIG. 3, the target has a clear linear retarder and orientation angle. Select a red box area in (a), as shown in (b), and place targets in different directions to obtain orientation angle, linear retarder and depolarization by forward scattering Lu-chipman polar decomposition, backscattering Lu-chipman polar decomposition and backscattering reciprocal polar decomposition.

Figure 4:
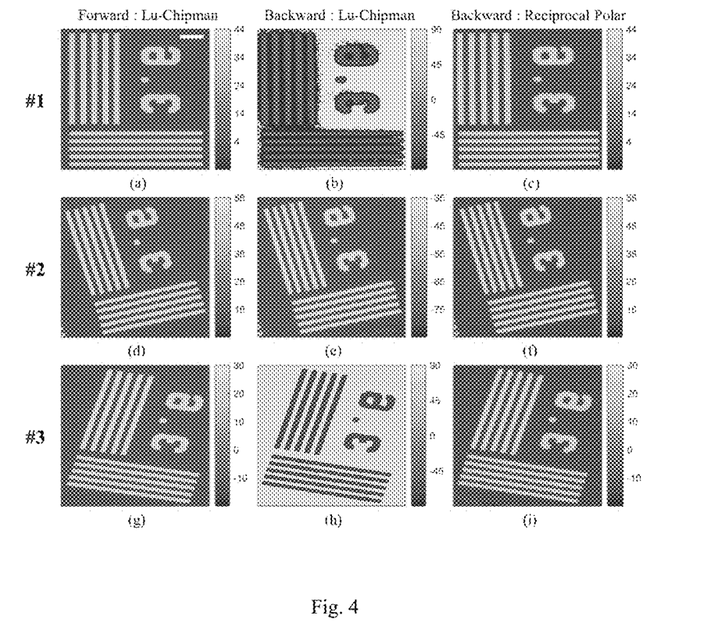
FIG. 4 is a comparison diagram of the orientation angles of the birefringent target in different directions obtained by forward scattering Lu-chipman polar decomposition, backscattering Lu-chipman polar decomposition, and backscattering reciprocal polar decomposition.

As shown in FIG. 4, three different directional targets were obtained through three different methods to obtain two-dimensional images of orientation angle, wherein (a), (b) and (c) are orientation angle of the three different methods for horizontally placing the target=, (d), (e) and (f) are orientation angle of the three different methods when rotating the target counterclockwise for 13° horizontally, and (g), (h) and (i) are orientation angle of the three different methods when rotating the target clockwise for 11° horizontally, and specific data are shown in Table 1.

Figure 5:
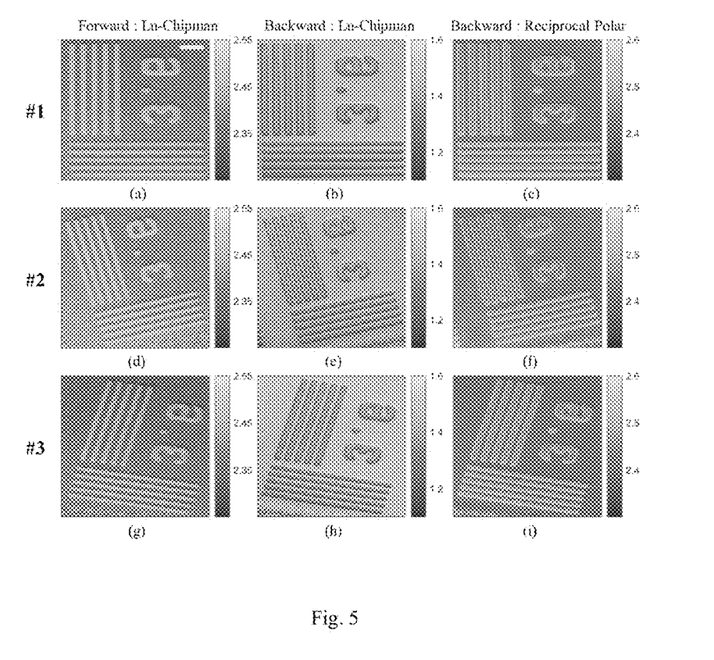
FIG. 5 is a comparison diagram of the linear retarder of the birefringent target in different directions obtained by forward scattering Lu-chipman polar decomposition, backscattering Lu-chipman polar decomposition, and backscattering reciprocal polar decomposition.

As shown in FIG. 5, three different directional targets were obtained through three different methods to obtain two-dimensional linear retarder, wherein (a), (b) and (c) are linear retarder of the three different methods for horizontally placing the target, (d), (e) and (f) are linear retarder of the three different methods when rotating the target counterclockwise by 13° horizontally, (g), (h) and (i) are linear retarder of the three different methods when rotating the target clockwise by 11° horizontally, and specific data is shown in Table 2.

Figure 6:
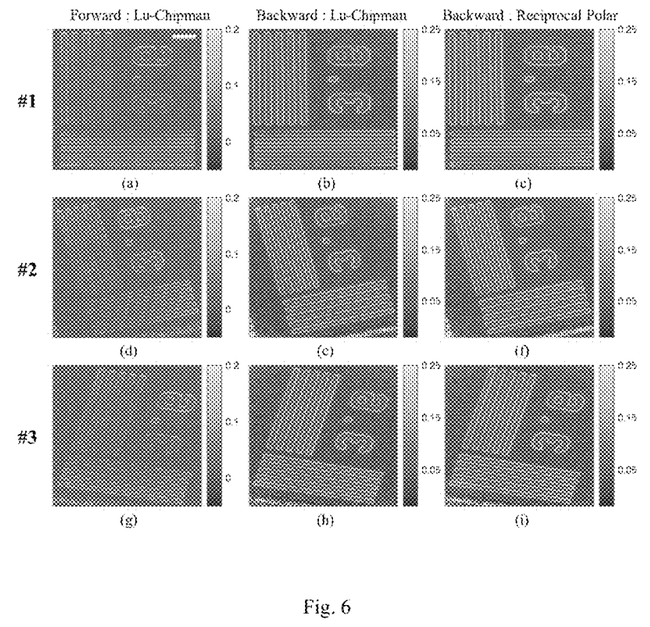
FIG. 6 is a comparison diagram of depolarization of the birefringent target in different directions obtained by forward scattering Lu-chipman polar decomposition, backscattering Lu-chipman polar decomposition, and backscattering reciprocal polar decomposition.

As shown in FIG. 6, three different directional targets were obtained through three different methods to obtain two-dimensional images of depolarization, wherein (a), (b) and (c) are depolarization of the three different methods for horizontally placing the target, (d), (e) and (f) are depolarization of the three different methods when rotating the target counterclockwise and horizontally placing it 13°, (g), (h) and (i) are depolarization of the three different methods when rotating the target clockwise and horizontally placing it 11°, and specific data is shown in Table 3.

Thorlabs provides data of a horizontally-placed NBS 1963A birefringent resolution target. As shown in Table 4, when the target is placed horizontally, the orientation angles and the linear retarder obtained by backward scattering reciprocal polar decomposition and forward scattering Lu-chipman polar decomposition are basically consistent with the data provided by the Thorlabs; when the target is placed 130 horizontally counterclockwise and 110 horizontally clockwise, the parameters of backscattering reciprocal polar decomposition and forward scattering Lu-chipman polar decomposition are basically consistent, while the results of backscattering Lu-chipman polar decomposition are erroneous.

From the experimental result, it can be clearly seen that the reciprocal polar decomposition of backscattering can not only obtain the correct orientation angle and linear retarder when placing in different directions, which shows the feasibility of the reciprocal polar decomposition of the Mueller matrix in the backscattering geometry, and can solve the problem of the backscattering Mueller matrix decomposition.

In each of the above-mentioned implementations, a backscattering Mueller matrix is converted into a symmetric matrix by the reciprocal polar decomposition of the backscattering Mueller matrix, a diattenuator matrix $M_D$ is obtained by the matrix QMG, then, eigenvalues and eigenvectors are obtained by orthogonal decomposition, the eigenvectors and eigenvectors are sorted to obtain the depolarization matrix $M_\Delta$ and the retarder matrix $M_R$, and then, polarization parameters (such as an orientation angle, a linear retarder, and depolarization) having physical significance may be obtained. By using this decomposition, not only is the decomposition complexity of the backscattering Mueller matrix greatly lowered, but also the polarization parameters (such as the orientation angle, linear retarder, and depolarization) having physical significance may be obtained.

Table 1. Data of orientation angle obtained from targets in different directions by using different decompositions. #1: a horizontally-placed target, #2: the horizontally-placed target is rotated counterclockwise for 13°, #3: the horizontally-placed target is rotated clockwise for 110, $\theta_B$: orientation angles of target lines, and $\theta_C$: orientation angles of target backgrounds.

|   |              | Forward scattering | Backscattering | |
|---|--------------|--------------------|----------------|---|
|   |              | Lu-Chipman polar decomposition | Lu-Chipman polar decomposition | Reciprocal polar decomposition |
| #1 | $\theta_B$ (deg) | 36.67 (0.59) | −59.85 (7.70) | 35.35 (0.49) |
|    | $\theta_C$ (deg) | 1.67 (0.33)  | 85.67 (25.46) | 0.10 (0.28) |
| #2 | $\theta_B$ (deg) | 50.81 (1.53) | −41.05 (0.92) | 49.07 (1.10) |
|    | $\theta_C$ (deg) | 16.27 (0.33) | −76.84 (0.33) | 14.12 (0.29) |
| #3 | $\theta_B$ (deg) | 23.47 (1.64) | −69.96 (0.82) | 20.83 (0.90) |
|    | $\theta_C$ (deg) | −11.56 (0.32) | 76.05 (0.31) | −13.78 (0.27) |

Table 2. Data of linear retarders obtained from targets in different directions by using different decompositions. #1: a horizontally-placed target, #2: the horizontally-placed target is rotated counterclockwise for 13°, #3: the horizontally-placed target is rotated clockwise for 11°, $\delta_B$: linear retarders of target lines, and $\delta_C$: linear retarders of target backgrounds.

|     |             | Forward scattering | Backscattering | |
|-----|-------------|--------------------|----------------|---|
|     |             | Lu-Chipman polar decomposition | Lu-Chipman polar decomposition | Reciprocal polar decomposition |
| #1  | $\delta_B$ (rad) | 2.448 (0.017) | 1.344 (0.038) | 2.471 (0.019) |
|     | $\delta_C$ (rad) | 2.370 (0.024) | 1.436 (0.010) | 2.429 (0.005) |
| #2  | $\delta_B$ (rad) | 2.465 (0.019) | 1.353 (0.045) | 2.467 (0.022) |
|     | $\delta_C$ (rad) | 2.396 (0.021) | 1.417 (0.011) | 2.433 (0.005) |
| #3  | $\delta_B$ (rad) | 2.419 (0.022) | 1.354 (0.034) | 2.466 (0.017) |
|     | $\delta_C$ (rad) | 2.348 (0.024) | 1.467 (0.011) | 2.407 (0.005) |

Table 3. Data of depolarization obtained from targets in different directions by using different decompositions. #1: a horizontally-placed target, #2: the horizontally-placed target is rotated counterclockwise for 13°, #3: the horizontally-placed target is rotated clockwise for 11°, $\Delta_B$: depolprization of target lines, and $\Delta_C$ depolarization of target backgrounds.

|     |         | Forward scattering | Backscattering | |
|-----|---------|--------------------|----------------|---|
|     |         | Lu-Chipman polar decomposition | Lu-Chipman polar decomposition | Reciprocal polar decomposition |
| #1  | $\Delta_B$ | 0.032 (0.018) | 0.093 (0.036) | 0.100 (0.036) |
|     | $\Delta_C$ | 0.016 (0.015) | 0.032 (0.010) | 0.041 (0.006) |
| #2  | $\Delta_B$ | 0.037 (0.024) | 0.095 (0.040) | 0.108 (0.041) |
|     | $\Delta_C$ | 0.019 (0.016) | 0.034 (0.009) | 0.043 (0.009) |
| #3  | $\Delta_B$ | 0.030 (0.018) | 0.092 (0.041) | 0.098 (0.039) |
|     | $\Delta_C$ | 0.017 (0.016) | 0.028 (0.011) | 0.036 (0.010) |

TABLE 4

Data of horizontally-placed birefringent target of Thorlabs

| $\theta_B$ (deg) | $\theta_C$ (deg) | $\delta_B$ (rad) | $\delta_C$ (rad) |
|---|---|---|---|
| 34.5 ± 4.3 | 0.1 ± 3.8 | 2.436 ± 0.084 | 2.383 ± 0.068 |

The embodiments should not be regarded as limitations on the present disclosure, however, any improvements made based on the spirit of the present disclosure shall fall within the protection scope of the present disclosure.

The invention claimed is:

1. An imaging method based on a reciprocal polar decomposition for backscattering Mueller matrices, comprising the following steps:

step 1, guiding an incident beam generated from a light source through an optical component to a target biological tissue to be imaged, and receiving a reflected beam of the incident beam scattered from the target biological tissue to be imaged at a polarization camera to obtain a backscattering Mueller matrix of the optical component;

step 2, according to a relation between a diattenuator matrix and a retarder matrix of each of forward and backward light paths, transforming a Mueller matrix M backscattering into a symmetric matrix QM;

step 3, obtaining a diattenuator matrix $M_{D1}$ by a matrix QMG;

step 4, obtaining eigenvalues and eigenvectors through orthogonal decomposition;

step 5, sorting the eigenvectors to obtain a depolarization matrix $M_{\Delta d}$ and a retarder matrix $M_{R1}$;

step 6, obtaining polarization parameters by the obtained depolarization matrix $M_{\Delta d}$ and retarder matrix $M_{R1}$;

step 7, obtaining two-dimensional polarization images of the target biological tissue based on the obtained polarization parameters.

2. The imaging method based on the reciprocal polar decomposition for the backscattering Mueller matrices of claim 1, wherein in step 2, the reciprocal polar decomposition decomposes the backscattering Mueller matrix into $M = M_{D2} M_{R2} M_{\Delta d} M_{R1} M_{D1}$, wherein $M_{R1}$ is the retarder matrices in the forward light path, $M_{D1}$ is the diattenuator matrices in the forward light path, $M_{\Delta d}$ is the depolarization matrix, $M_{R2}$ is the retarder matrices in the backward light path, and $M_{D2}$ is the diattenuator matrices in the backward light path;

according to the reciprocity of forward light path and backward light path, the diattenuator matrix and the retarder matrix of the backward path are represented by the diattenuator matrix and the retarder matrix of the forward light path:

$$M_{D2} = Q M_{D1}^T Q$$

$$M_{R2} = Q M_{R1}^T Q$$

wherein Q=diag (1,1,−1,1);

the backscattering Mueller matrix is converted into the symmetric matrix $$QM(QM = M_{D1}^T M_{R1}^T M'_{\Delta d} M_{R1} M_{D1}), \text{ wherein } M_{D1} = \begin{pmatrix} 1 & D^T \\ D & m_D \end{pmatrix},$$

$$M_{R1} = \begin{pmatrix} 1 & 0^T \\ 0 & m_R \end{pmatrix}, M'_{\Delta d} = QM_{\Delta d} = \text{diag}(d_0, d_1, -d_2, d_3),$$

$$m_d = \sqrt{1-D^2}\, I + \left(1 - \sqrt{1-D^2}\right) \hat{D}\hat{D}^T,$$

a diattenuator vector D has a length D, I is a 3×3 unit matrix, $$\hat{D} = D/|D|, \; (m_R)_{ij} = \delta_{ij}\cos R + a_i a_j(1 - \cos R) + \sum_{k=1}^{3} \varepsilon_{ijk} a_k \sin R,$$

$\delta_{ij}$ is a Kronecker delta, $\varepsilon_{ijk}$ is a Levi-Civita permutation symbol, R is a retarder, and $$(1, a_1, a_2, a_3)^T = \left(1, \hat{R}^T\right)^T$$

is a normalized Stokes vector of a fast axis.

3. The imaging method based on the reciprocal polar decomposition for the backscattering Mueller matrices of claim 2, wherein the symmetry of the matrix QM is ensured according to $$QM = \frac{(QM + QM^T)}{2}.$$

4. The imaging method based on the reciprocal polar decomposition for the backscattering Mueller matrices of claim 2, wherein in step 3, $$(QMG)\begin{pmatrix}1\\D\end{pmatrix} = d_0(1-D^2)\begin{pmatrix}1\\D\end{pmatrix}$$

is obtained according to $$(QMG)(M_{D1}G) = (1-D^2)M_{D1}^T(M_{R1}^T M'_{\Delta d} M_{R1}) = (1-D^2)M_{D1}^T M',$$

$$M' = M_{R1}^T M'_{\Delta d} M_{R1} = \begin{pmatrix}d_0 & 0^T\\0 & m'\end{pmatrix}, \text{ and } QM = \frac{(QM+QM^T)}{2},$$

the diattenuator vector D is obtained therefrom, and then, the diattenuator matrices $M_{D1}$ and M' are obtained, wherein G=diag (1,−1,−1,−1).

5. The imaging method based on the reciprocal polar decomposition for the backscattering Mueller matrices of claim 3, wherein in step 4, $$m_R^T \text{diag}(d_1, -d_2, d_3) m_R = m'$$

is obtained according to $$(1-D^2)M_{D1}^{-1} = GM_{D1}G \text{ and } M' = M_{R1}^T M'_{\Delta d} M_{R1} = M_{D1}^{-1} QMM_{D1}^{-1},$$

and orthogonal decomposition is performed to obtain the eigenvaluess and eigenvectors.

6. The imaging method based on the reciprocal polar decomposition for the backscattering Mueller matrices of claim 5, wherein the obtained eigenvectors are sorted to obtain $M_{\Delta d}$ and $M_{R1}$.

7. The imaging method based on the reciprocal polar decomposition for the backscattering Mueller matrices of claim 6, wherein in the absence of known information of the medium, and on the premise that det $(m_R)=1$, an order is determined by adopting a strategy that an absolute value of a total retarder R is minimized, and taking smaller absolute values of optical rotation y and a linear retarder δ into account, so that $M_{\Delta d}$ and $M_{R1}$ are obtained.

8. The imaging method based on the reciprocal polar decomposition for the backscattering Mueller matrices of claim 1, wherein the two-dimensional polarization images of the target biological tissue indicate microstructural properties of the target biological tissue.

\* \* \* \* \*